Oct. 26, 1926.
G. F. RIEPE
1,604,721
AUTOMATIC TRACK COVERING ATTACHMENT FOR PLANTERS AND THE LIKE
Filed June 21, 1926    2 Sheets-Sheet 1
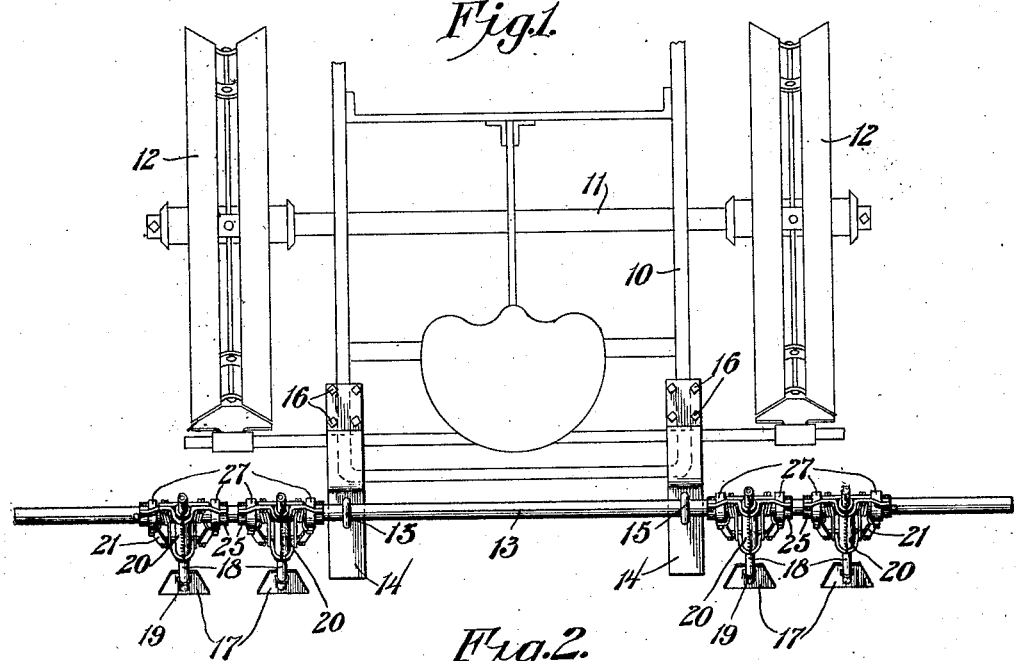
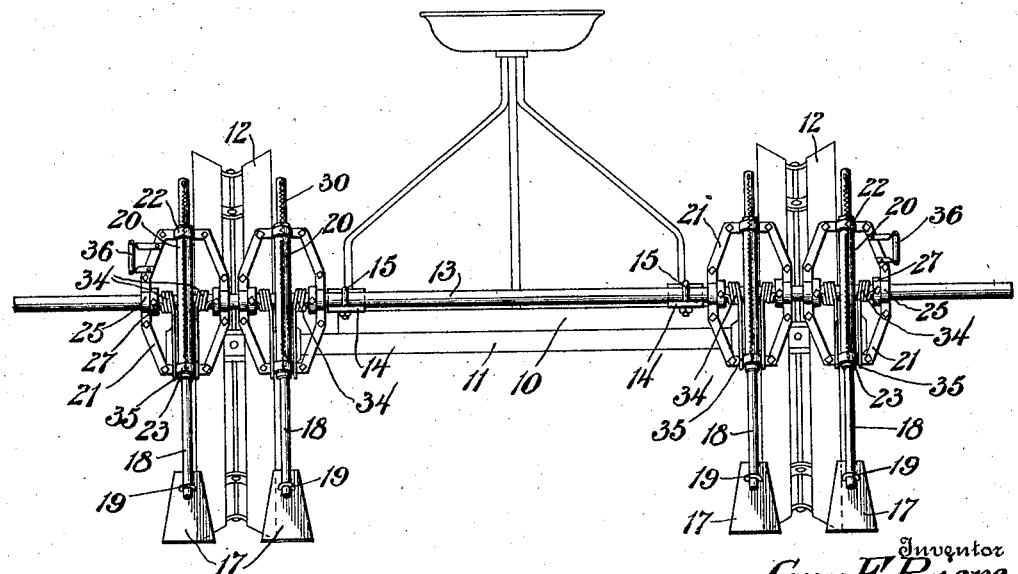
Inventor
Guy F. Riepe

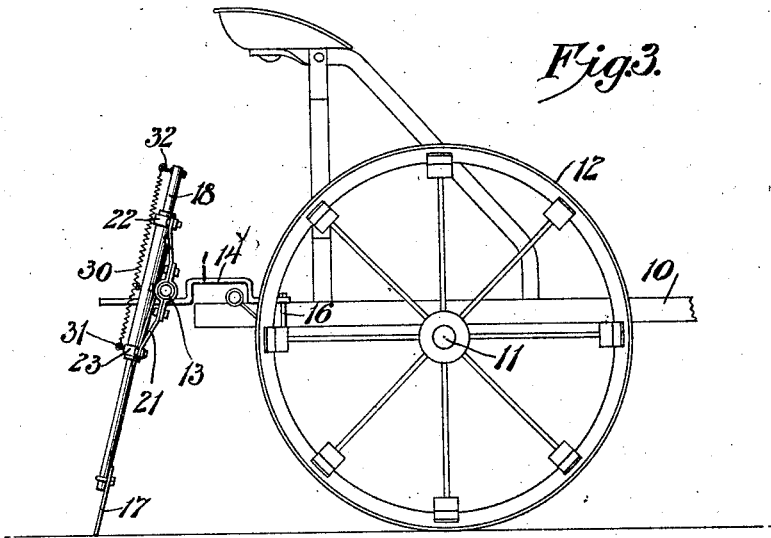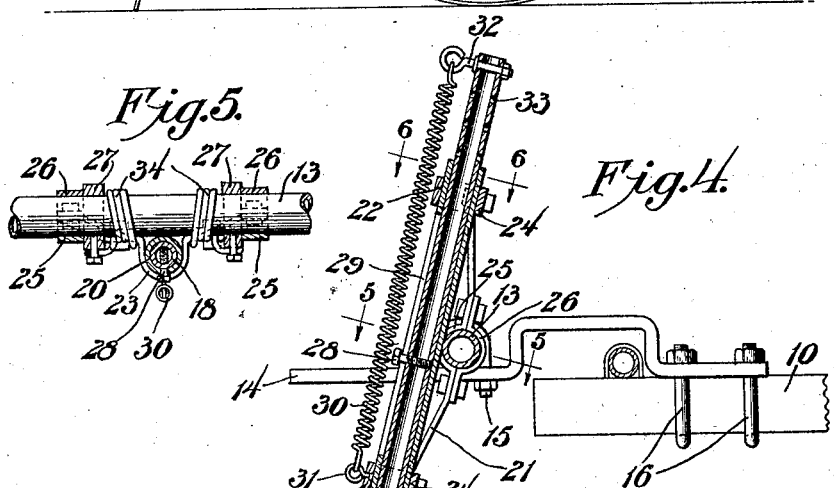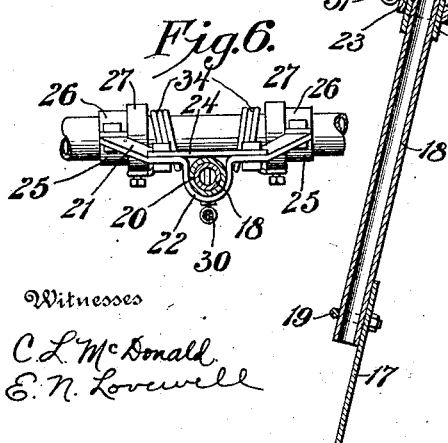

Patented Oct. 26, 1926.

1,604,721

UNITED STATES PATENT OFFICE.

GUY F. RIEPE, OF NEW LONDON, IOWA.

AUTOMATIC TRACK-COVERING ATTACHMENT FOR PLANTERS AND THE LIKE.

Application filed June 21, 1926. Serial No. 117,441.

This invention relates to an improved automatic attachment for corn planters and similar wheeled implements, which is adapted to cover the wheel tracks with loose dirt, so that subsequent rains will not pack the soil, or wash it away.

The object of the invention is to provide an attachment having scraper blades, which engage the ground adjacent the wheel tracks, and especially one which may be easily secured to any type of planter frame, and which will adapt itself automatically to the movement of the planter when turning corners or backing.

The specific construction of the invention and the advantages thereof will be more particularly explained in connection with the accompanying drawings, which illustrate the same in its preferred form.

In the drawings:

Figure 1 is a plan view of the invention attached to the frame of a corn planter.

Figure 2 is a rear elevation of the same.

Figure 3 is a side elevation of the same.

Figure 4 is a vertical longitudinal section through the attachment, showing also the rear end of the planter frame.

Figure 5 is a detail sectional view taken on the line 5—5 of Figure 4.

Figure 6 is a detail sectional view taken on the line 6—6 of Figure 4.

The invention is illustrated in connection with the frame 10 of a corn planter, having an axle 11 supported by wheels 12. The track covering elements are supported by a rod or bar 13, disposed transversely in rear of the frame 10, and secured to rearwardly extending brackets 14 by means of U-bolts 15, or equivalent fastening devices. The brackets 14 may be of any suitable shape or size to fit the frame of the planter on which they are used, and may be secured to the latter by U-bolts 16, or other suitable means. The covering elements are in the form of scrapers or blades 17, arranged in pairs behind the respective wheels 12. Each scraper 17 is secured to a rod or bar 18 by suitable bolts 19, which permit them to be angularly adjusted. Each rod or bar 18 is slidably mounted in a sleeve 20, which is supported in an elongated frame 21. This frame is formed at its upper and lower ends with loops 22 and 23 respectively, within which the ends of the sleeve are clamped by straps 24 secured to the frame adjacent the loops. The sides of each frame 21 are formed with semicircular portions 25, with which straps 26 cooperate to form bearings for supporting the frame and permitting it to have a limited rotational movement about the bar 13. Collars 27 are secured to the bar 13, just inside the sides of each frame 21, and prevent the latter from moving longitudinally of the bar 13.

Each bar or rod 18 is guided in the sleeve 20, and held against rotational movement therein by a bolt or pin 28, which projects through a longitudinal slot 29 in the sleeve. A coiled spring 30 is connected at one end to an eye 31, which is secured in the loop 23, and is connected at the other end to an eye bolt 32, which is secured in the upper end of the bar 18, whereby to urge the latter downwardly, and to hold the scraper 17 in contact with the ground. Several holes 33 may be provided in the upper end of the bar 18, so that the tension of the spring 30 may be adjusted. Coiled springs 34 surround the bar 13 at opposite sides of the sleeve 20, and each of these springs is secured at one end to the collar 27, and is extended at its other end, as at 35, to engage the lower end of the frame 21. Thus, it will be seen that while the frame 21 may rotate about the bar 13, this rotational movement is resisted by the springs 34, and the scrapers 17 are held in the ground with sufficient force to cause the dirt to be loosened, and to cover the tracks formed by the wheels 12.

In the normal operation of the planter, the scrapers 17 are pulled along in the ground, and the bars 18 supporting the same are inclined downwardly and rearwardly. If any unusual obstructions are encountered, the scrapers may yield rearwardly by reason of the springs 34, and upwardly by reason of the springs 30. In turning corners or in backing, as the bar 13 is carried rearwardly above the scrapers 17, the springs 30 may yield sufficiently to permit the scrapers to swing underneath the bar 13 toward the front of the planter. In so doing, the tension of the springs 34 is released, and as soon as the planter starts forwardly, the scrapers 17 will dig into the ground, and will swing back again to operative position.

It is preferred to attach a guard 36 to the outer side of the frame 21 at each side of the planter to prevent the planter wire from catching on the frame at the ends of the field. After the planter is well started across the field, the wire is drawn clear of the guards.

By the use of this invention, the tracks are covered with loose dirt, so that if a rain should come directly after planting, it will not cause the soil to pack, or wash the corn out of the ground. It also serves, in shallow planting, to cover any corn which might drop in low places, or in horses' tracks, so that it would not otherwise be covered.

While I have shown only one type of corn planter frame to which the invention is attached, it is obvious that with slight modifications it may be attached to any type of corn planter, or other implement which may be used. Various other modifications may also be made in the structural details of various features without any material departure from the salient features of the invention as expressed in the claims.

What is claimed is:

1. In an attachment for corn planters and the like, a supporting bar, means for attaching said bar to the rear end of the planter so as to extend transversely thereof, a plurality of frames mounted on said bar, a sleeve carried by each frame and normally pointing toward the ground, a bar slidable but not rotatable in said sleeve, a scraper mounted at the lower end of each slidable bar, and yieldable means for urging each slidable bar downwardly so that the scraper engages the ground.

2. In an attachment for corn planters and the like, a supporting bar, means for attaching said bar to the rear end of the planter so as to extend transversely thereof, a plurality of sleeves mounted to swing about the bar as an axis, but normally inclined downwardly and rearwardly, bars slidable longitudinally of the respective sleeves, scrapers mounted at the lower ends of said slidable bars, yieldable means for urging said slidable bars downwardly so that the scrapers engage the ground, and yieldable means resisting the rearward swinging movement of the lower ends of the sleeves about the transverse bar as the planter moves forwardly.

3. In an attachment for corn planters, a supporting bar, means for attaching said bar to the rear end of the planter so as to extend transversely thereof, a plurality of sleeves mounted to swing about the bar as an axis but normally inclined downwardly and rearwardly, bars slidable longitudinally of the respective sleeves, scrapers mounted at the lower ends of said slidable bars, means connecting the slidable bars with the respective sleeves to normally hold the scrapers in contact with the ground but yieldable sufficiently to permit the scrapers to swing beneath the transverse bar when the planter is backed, and yieldable means to prevent the sleeves from swinging rearwardly beyond their normal position when the planter travels forwardly.

4. In an attachment for corn planters, a bar normally disposed in a rearwardly and downwardly inclined position with a scraper secured to its lower end, means for supporting said bar on the planter so that it may move longitudinally or swing rearwardly about a horizontal axis, and resilient means resisting both the longitudinal upward movement and the swinging movement as the planter travels forwardly, thus holding the bar in normal position with the scraper in contact with the ground.

5. In an attachment for corn planters, a bar normally disposed in a rearwardly and downwardly inclined position with a scraper secured to its lower end, means for supporting said bar on the planter so that it may move longitudinally or swing rearwardly about a horizontal axis, and resilient means resisting both the longitudinal upward movement and the swinging movement as the planter travels forwardly, thus holding the bar in normal position with the scraper in contact with the ground, the means for resisting the longitudinal upward movement of the bar being yieldable sufficiently to permit the bar to swing underneath its axis and to trail whenever the planter is backed.

6. In an attachment for corn planters, a frame mounted to swing about an axis transverse to the planter, a sleeve secured in said frame perpendicular to its axis and normally inclined downwardly and rearwardly, a bar slidable longitudinally in said sleeve, a scraper secured to the lower end of the bar, yieldable means resisting the upward movement of the bar in the sleeve so as to hold the scraper normally in contact with the ground, and yieldable means to resist the swinging movement of the frame as the planter travels forwardly.

7. In an attachment for corn planters, a frame mounted to swing about an axis transverse to the planter, a sleeve secured in said frame perpendicular to its axis and normally inclined downwardly and rearwardly, a bar slidable longitudinally in said sleeve, a scraper secured to the lower end of the bar, yieldable means resisting the upward movement of the bar in the sleeve so as to hold the scraper normally in contact with the ground, and yieldable means to resist the swinging movement of the frame as the planter travels forwardly, the means for resisting the longitudinal upward movement of the bar being yieldable sufficiently to permit the bar to swing with the frame underneath its axis and to trail whenever the planter is backed.

In testimony that I claim the foregoing as my own, I have hereto affixed my signature.

GUY F. RIEPE.